United States Patent [19]
Goldenberg et al.

[11] Patent Number: 6,084,373
[45] Date of Patent: Jul. 4, 2000

[54] RECONFIGURABLE MODULAR JOINT AND ROBOTS PRODUCED THEREFROM

[75] Inventors: Andrew A. Goldenberg, Toronto; Nenad Kircanski; Manja Kircanski, both of North York, all of Canada; Ananth Seshan, Pune, India

[73] Assignee: Engineering Services Inc., Toronto, Canada

[21] Appl. No.: 09/108,392

[22] Filed: Jul. 1, 1998

[30] Foreign Application Priority Data

Jul. 1, 1997 [GB] United Kingdom ................ 9713765

[51] Int. Cl.$^7$ ........................................ B25J 9/18
[52] U.S. Cl. ............................ 318/568.11; 901/23
[58] Field of Search .................. 318/568.11, 568.12, 318/568.2, 568.21, 568.24, 564; 901/15, 8, 23, 28, 6

[56] References Cited

U.S. PATENT DOCUMENTS

| | | | |
|---|---|---|---|
| 4,975,856 | 12/1990 | Vold et al. | 395/98 |
| 4,984,959 | 1/1991 | Kato | 414/744.3 |
| 5,293,107 | 3/1994 | Akeel | 318/568.11 |
| 5,428,713 | 6/1995 | Matsumaru . | |
| 5,523,662 | 6/1996 | Goldenberg et al. . | |
| 5,672,924 | 9/1997 | Wallace et al. | 310/152 |

FOREIGN PATENT DOCUMENTS

| | | |
|---|---|---|
| 426264 | 5/1991 | European Pat. Off. . |
| 19517852 | 12/1995 | Germany . |
| WO9006546 | 6/1990 | WIPO . |

*Primary Examiner*—Jonathan Salata
*Attorney, Agent, or Firm*—Nancy E. Hill; Lynn C. Schumacher; Hill & Schumacher

[57] ABSTRACT

The present invention provides a reconfigurable modular drive joint that can be used as the basis for building and configuring robotic and automated systems as an interconnected network of individual nodes, with each node representing a single modular joint. Each modular joint can be quickly set up in either a roll, pitch or yaw configuration. A large number of different robot structures can be built using a small number of the modular joints in any of these three configurations. The modules are equipped with quick-connect mechanisms so that a new robot structure can be assembled in a few minutes. A robot or other automated system assembled from such modular joints is a true reconfigurable and modular system. The control system is decentralized. Each modular joint is provided with its own built-in control system and electronics. The modular joints each include a motor and associated sensors. An embedded control system including a power amplifier for the motor, a sensor interface, microprocessor, and communication circuitry are provided. The only external connections to each module is a communication bus between the modules and the host computer and a power supply bus.

30 Claims, 11 Drawing Sheets

RECONFIGURABLE MODULAR JOINT AND ROBOTS PRODUCED THEREFROM

FIELD OF THE INVENTION

The present invention relates generally to a reconfigurable modular robotic joint, and more particularly this invention relates to reconfigurable modular joints used as a basic drive unit from which robots and other automated systems are constructed as an interconnected network of individual reconfigurable modular drive systems.

BACKGROUND OF THE INVENTION

In the design of known non-modular robotic systems, the type of loading (tension, compression, bending and torsion) on each actuator (or joint) can be estimated based on the configuration of the robot which is fixed. The designer normally works backwards incrementally from the end-effector to the base joint, by assuming a worst case configuration of the robot for each joint, to calculate the power/torque required based on the pattern of loading that will be imposed on that joint by the payload of the robot and all joints and links between this joint and the payload. Based on such computations, the non-modular robotic system would be designed as an integral (indivisible) system so that the user will not be able to reconfigure or change the structure without major re-design of the system.

In a modular robotic system, the joints can be arranged, or configured, differently. As a result, there are multiple possible robot structures for the same number of modular joints. Based on the task to be accomplished by a modular robotic system, the user would interconnect certain number of modules to form a desired system. The system may consist of one or more mechanisms (robotic arms, or manipulators). Then, the user would connect the control system to program the motion and actions in accordance with the task specification. The motion may include point-to-point motion, or trajectory tracking motion. The actions may include end-effector control, interfacing to other systems such as tools, machines and the like.

Prior modular robotic systems have several major limitations both in terms of mechanics and electronic control systems controlling the robot. Firstly, the modules have a fixed structure, so that they are permanently configured as either "roll" modules, or "pitch" modules, or "yaw" joints. This is a major limitation for the user when there is a need for the same module to be configured as a "roll" or "pitch" or "yaw" module depending on the task requirements. The modules have no built-in electronics and processors. Further, these modules are configured in such a way that the modules proximal to the manipulator base contain much more wiring than the distal ones so that in general the modules are not mutually exchangeable. In other words, a module designed to be "module #4" in a chain of 6 modules, can not be used as a module #3 since it has no built-in wiring system to support signal transmission to the robot controller. The controller is centralized and connected to the base module through a thick multi-conductor cable system. Therefore a system assembled from such modules, in addition to being modular only in a very limited mechanical sense, is not reconfigurable. In addition, the control system electronics is centralized so that the modules cannot be considered as "intelligent" units taken alone since they lack dedicated control processors and associated software.

It would be very advantageous to provide a self-contained, reconfigurable modular robot joint which can be easily and rapidly assembled to provide several types of joint movement. It would also be advantageous to provide a modular joint which can be easily cascaded to other modular drive joints to build up an integrated robotic or automated system with each joint under overall control by a host controller.

SUMMARY OF THE INVENTION

An object of the present invention is to provide a reconfigurable modular joint that can be used as the basis for building and configuring robotic and automated systems as an interconnected network of individual nodes, with each node comprising a single reconfigurable modular joint. Furthermore, such an automated system would allow for the addition, removal and rapid integration of the reconfigurable modular joints to suit different applications.

The present invention overcomes the above-mentioned four major limitations of prior robotic joints by providing a modular joint having a reconfigurable structure, so that each modular joint can be quickly set up as either a "roll" module, "pitch" module, or as a "yaw" module. Therefore, a large number of different robot structures can be built using a small number of the modular joints in any of these three configurations. The modules are equipped with quick-connect mechanisms so that a new robot structure can be assembled in a few minutes.

A robot or other automated system assembled from such modular joints is a true reconfigurable and modular system. The control system is decentralized. Each modular joint is provided with its own built-in control system and electronics. The modular joints each include a motor and associated sensors. The modules comprise an embedded control system including a power amplifier for the motor, a sensor interface, microprocessor, and communication circuitry. The only external connections to each module is a communication bus between the modules and the host computer and a power supply bus. The connectors are small size and identical on each module. Thus, the modules are mutually exchangeable.

The modular joints share the common communication bus between themselves, and a host computer which allows a user to enter motion and task commands. Therefore the modular joints are "intelligent" in terms of their own processing capability with each modular joint having its own control and communication software that allows receiving, decoding, and broadcasting of messages to and from other modular joints in the system so that each modular joint can carry out actions based on the messages from other modular joints.

Each reconfigurable modular joint provides automated motion control along or about a single axis (degree of freedom). The modules can be physically linked to form an integrated robotic system wherein cascading multiple modules provides a system with motion control about multiple axes. Alternatively, the modular joints may be dispersed in an automation cell as individual modular drive units interconnected with each other.

In one aspect of the invention there is provided a reconfigurable modular joint comprising a first housing having an axis of rotation. The modular joint includes a drive means which is located in the housing and a first coupling means for releasibly coupling a first link member to the first housing. The joint includes a second coupling means connected to the drive means for releasibly coupling a second link member to the first housing in one of two configurations including a first configuration in which a second link member is rotatable by the drive means about the axis of rotation and a second configuration in which a second link member is moveable by the drive means in an arcuate path about the first housing in a plane perpendicular to the axis of rotation.

In another aspect of the invention there is provided a reconfigurable modular joint comprising a first housing having an axis, a drive means located in the housing and a first coupling means for releasibly coupling a first link member to the first housing. The modular joint includes a second coupling means connected to the drive means for releasibly coupling a second link member to the first housing, the drive means being connected to the second coupling means and adapted to move the first and second link member attached to the second coupling means in one of translational and rotational movement with respect to the first housing.

In another aspect of the invention there is provided a reconfigurable modular robot, comprising a plurality of link members. The modular robot includes at least one modular joint including at least a first housing, a first coupling mechanism, a second coupling mechanism and a releasibly attachable third coupling mechanism. The first housing has a drive means, an axis of rotation and opposed ends. The first coupling mechanism is for releasibly coupling a link member to one of the opposed ends of the first housing. The second coupling mechanism is for releasibly coupling a link member to the other of the opposed ends of said first housing. The releasibly attachable third coupling mechanism is for releasibly coupling a link member to the first housing in a plane perpendicular to its axis of rotation. The joint may also include a releasibly attachable fourth coupling mechanism which is for releasibly coupling a link to the first housing in a plane perpendicular to its axis of rotation and one of the third coupling mechanism and the second coupling mechanism is moveable by the drive means in an arcuate path about the first housing in a plane perpendicular to the axis of rotation. The robot includes an end-effector connected to one of the second link members driven by one of the modular joints. The robot includes computer control means.

BRIEF DESCRIPTION OF THE DRAWINGS

The reconfigurable modular joint and robotic systems constructed from the modular joints forming the present invention will now be described, by way of example only, reference being had to the accompanying drawings, in which.

DETAILED DESCRIPTION OF THE INVENTION

A) MECHANICAL SYSTEM i) Reconfigurable Joints

The reconfigurable modular joint forming the present invention can be rapidly reconfigured and used as a rotary drive joint in a pitch, roll or yaw configuration using a quick change coupling system. The basic modular robotic joint forming the core of the present modular drive system comprises a central housing enclosing a motor drive and connectors for connecting two links to the central housing.

Figure 1:
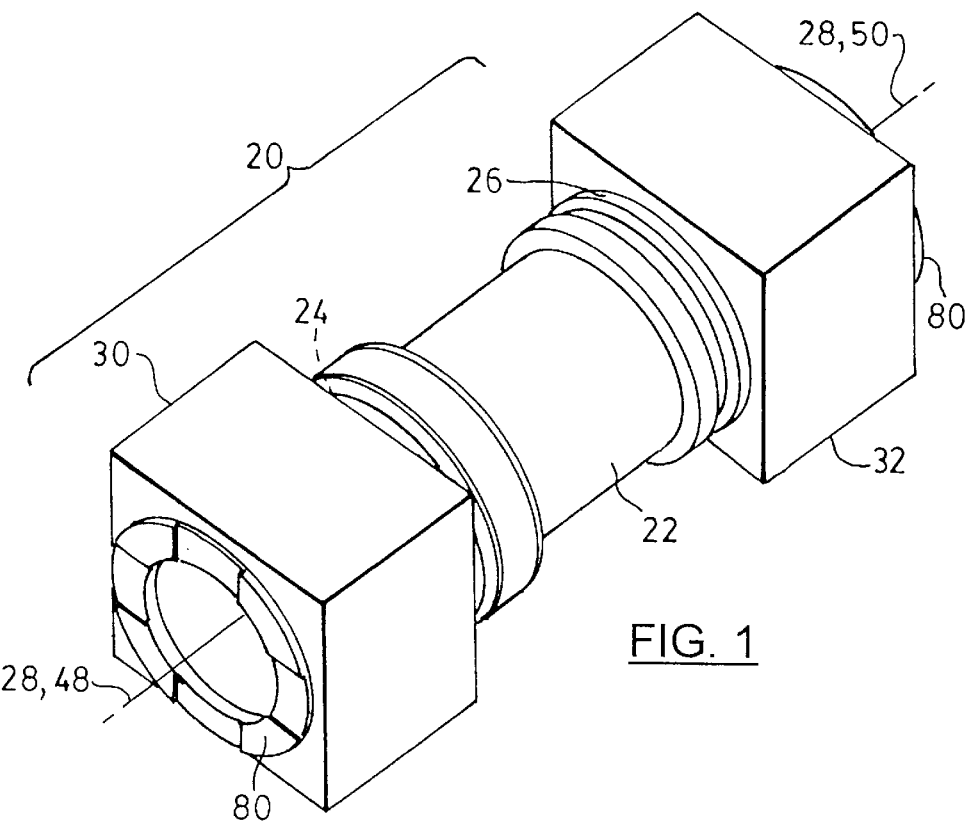
FIG. 1 is a perspective view of a modular joint constructed in accordance with the present invention configured to provide a modular joint having a roll configuration.
Figure 3:
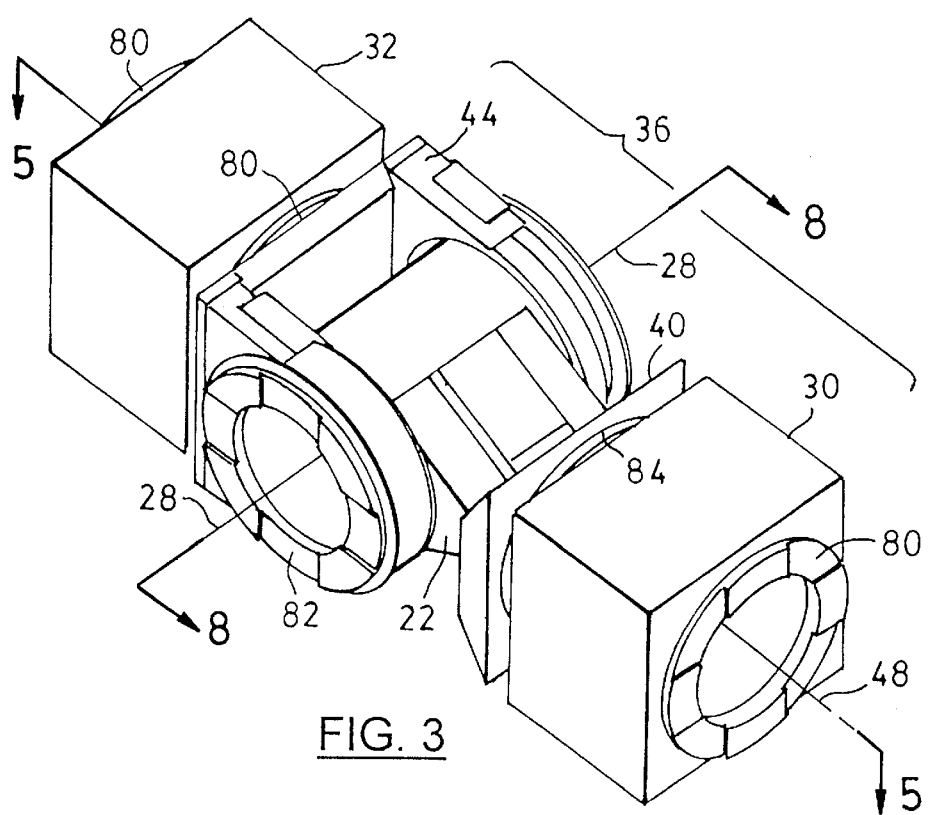
FIG. 3 is a perspective view of a modular joint configured to provide a joint with a yaw configuration.
Figure 2:
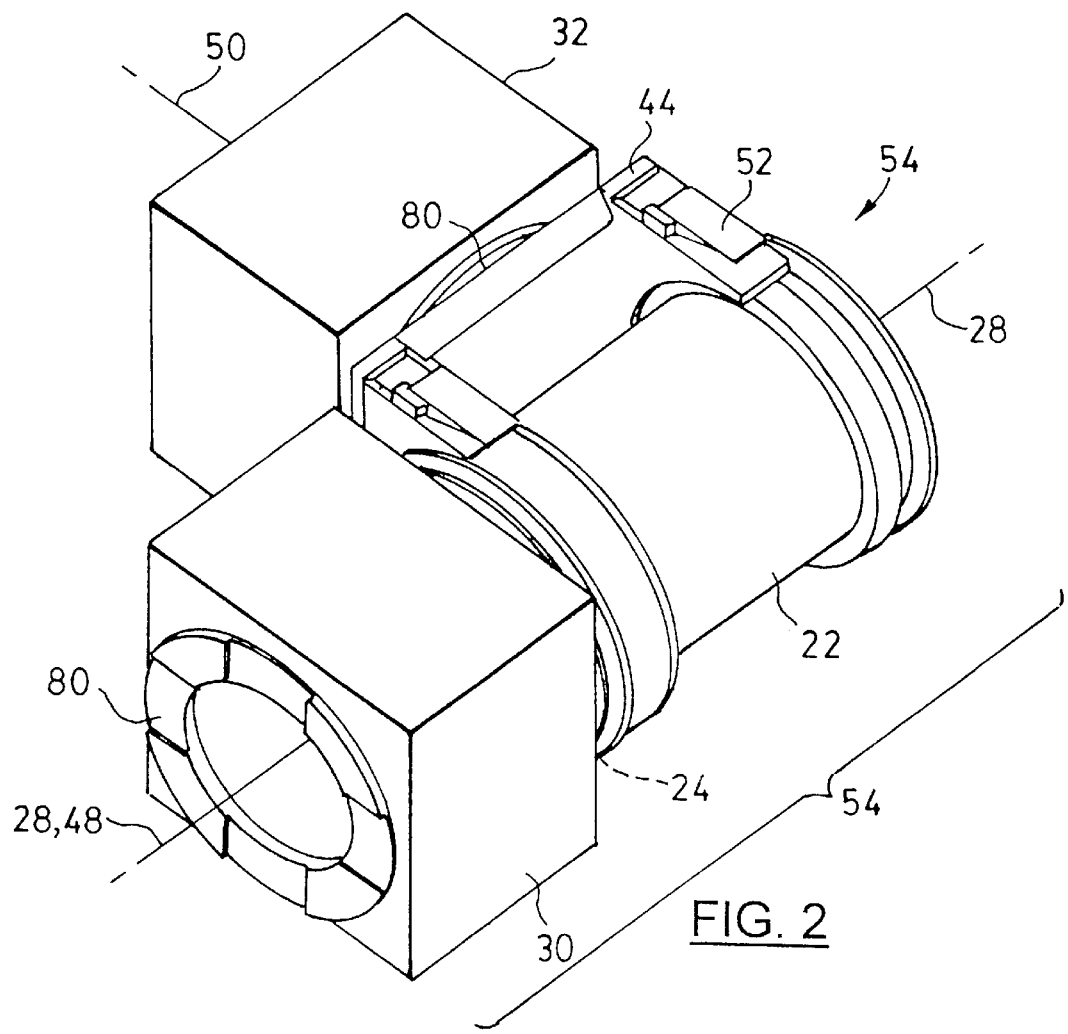
FIG. 2 is a perspective view of a modular joint configured to provide a joint with a pitch configuration.

FIGS. 1 to 3 show the three basic modular joint configurations which can be produced in accordance with the present invention. FIG. 1 illustrates a basic modular joint 20 comprising a central housing 22 with an electrical compartment housing 30 attached to one end of the central housing 22 using a releasible coupling mechanism 24. FIG. 1 shows attached to modular joint 20 is an electrical compartment box 32 attached at the other end of housing 22 using another releasible coupling mechanism 26. Compartment 32 is attached to a subsequent housing 22 in the next modular joint in the series or alternatively compartment 32 could be replace by an end-effector or tool in the case where no further modules are used. Modular joint 20 and housing 32 attached thereto as shown in FIG. 1 provides a roll configuration.

FIG. 2 illustrates a modular joint shown generally at 54 and a compartment 32 is attached to housing 22 in such a way as to provide the pitch configuration. In this case electronic compartment housing 30 is attached at one end of central housing 22 using coupling mechanism 24 so axis 48 of housing 30 is coaxial with axis 28. Housing 32 is attached to central housing 22 using a releasible coupling mechanism 44 with its axis 50 perpendicular to axis 28 of central housing 22.

Referring to FIG. 3, an alternative modular joint is shown at 36 comprising a compartment 30 releasibly attached to central housing 22 using a releasible coupling mechanism 40. Compartment 32 attached to central housing 22 using coupling mechanism 44 to provide the yaw configuration in which the axis 48 of housing 30 is perpendicular to axis 28 of central housing 22.

The electronic compartment housings 30 and 32 are structurally rigid and provide the necessary structural strength for the particular application for which the robotic system is being utilized. It will be understood however that compartments 30 and 32 provide linkage connections between the modular joint(s), the support base and the end-effector and may or may not contain electronic circuitry. These linkages are designed for quick connection to the modular joints in any of the above-mentioned three configurations thereby advantageously providing a very versatile modular joint.

Figure 4:
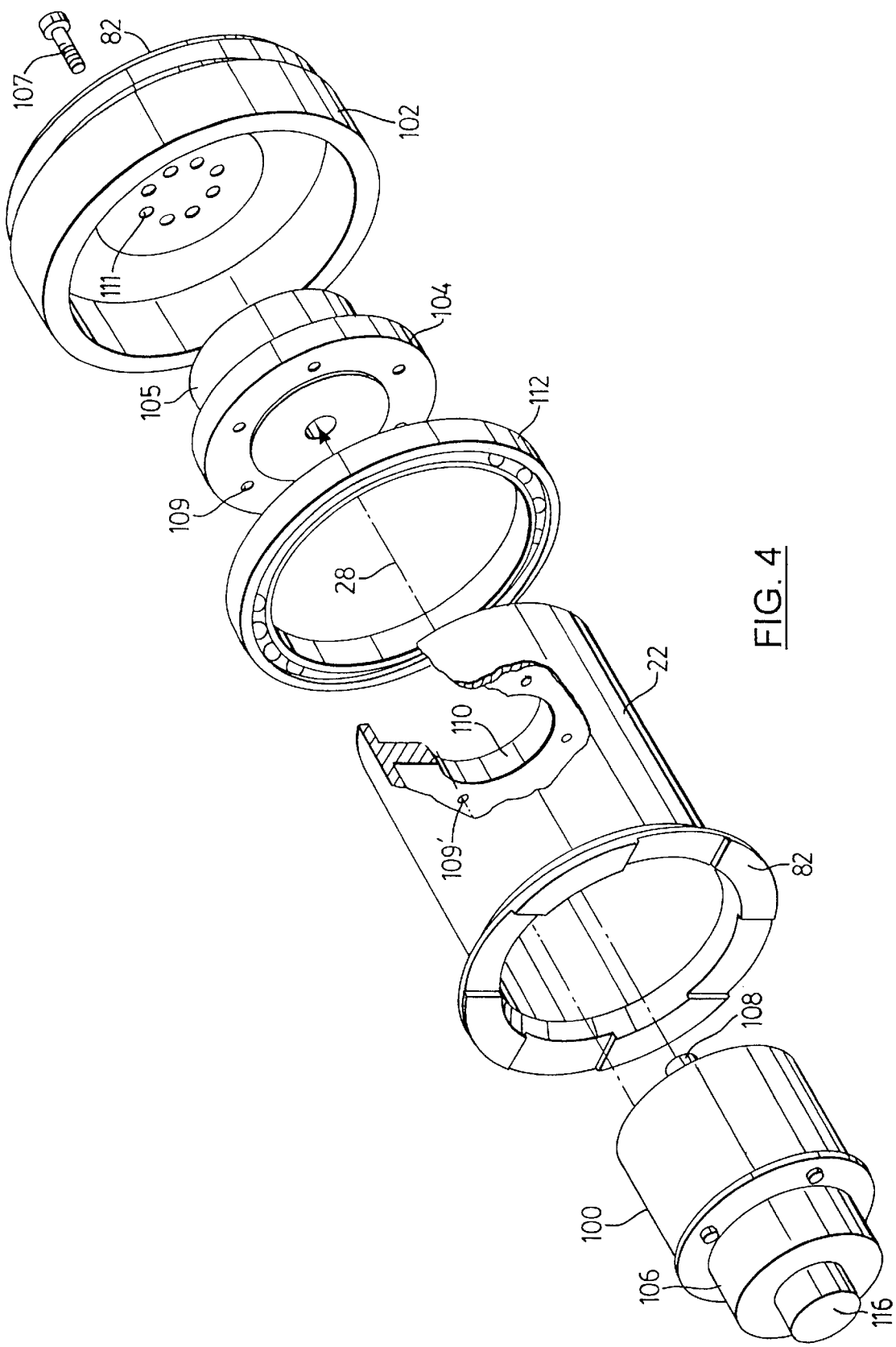
FIG. 4 is a perspective view of a disassembled central housing forming part of the modular joint.
Figure 5:
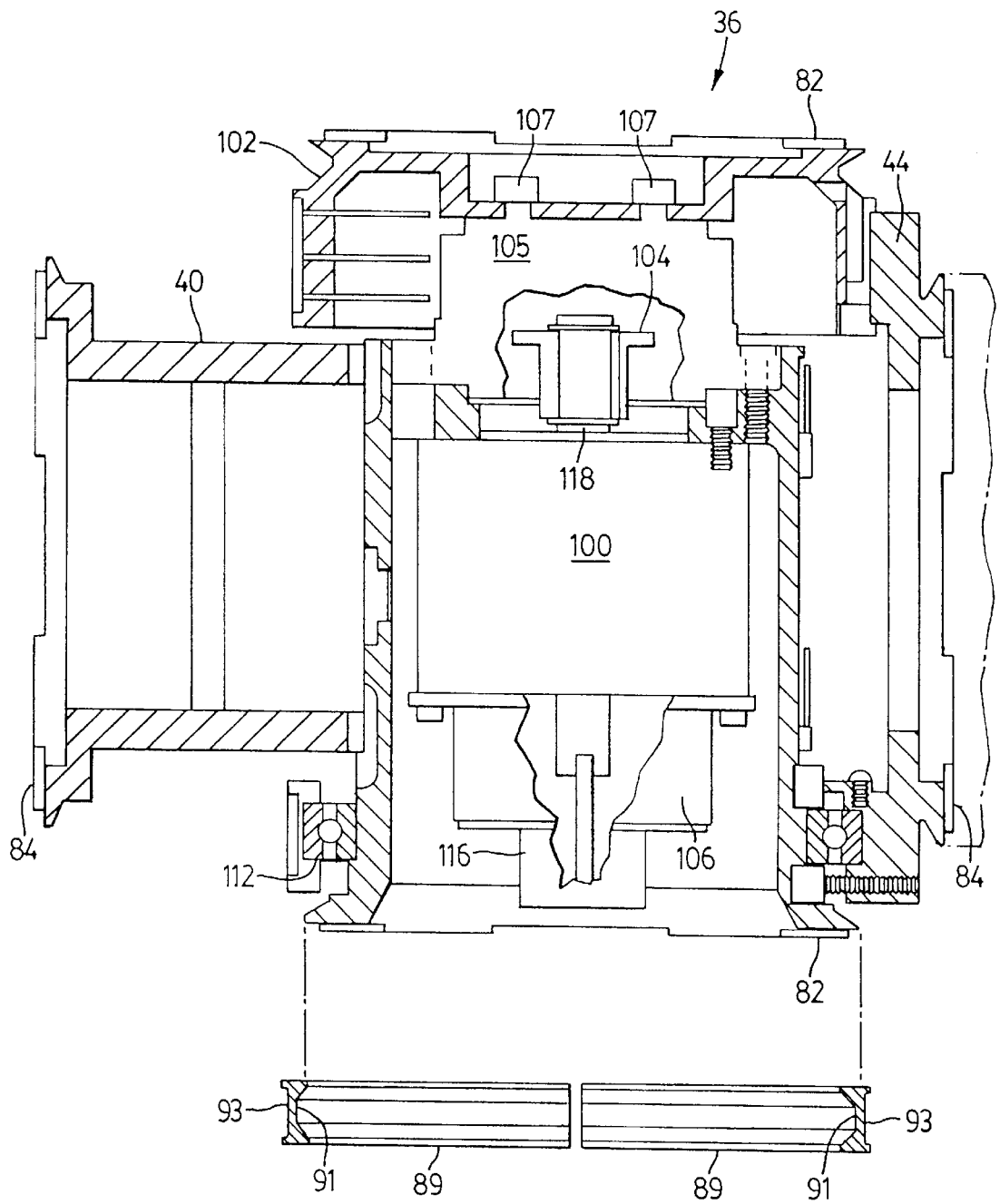
FIG. 5 is a cross sectional view taken along the line 8—8 of FIG. 3.

Referring to FIGS. 4 and 5, located within housing 22 are a brushless servo motor 100 with a keyed shaft 108 which is inserted into a harmonic drive 104 and a brake 106 for preventing the joint from back driving when the power is turned off. The harmonic drive 104 includes a bearing housing 105 which encloses a bearing (not shown). Housing 105 is rigidly bolted to housing 22 by several bolts (not shown) threaded through holes 109 in housing 105 and holes 109' in housing 22. The side of bearing housing 105 facing adjacent to flange housing 102 is open and several bolts 107 are used to rigidly bolt the flange housing to the bearing in housing 105 through holes 111 in the flange housing. The diameter of hole 110 at one end of housing 22 is smaller than the outer diameter of the housing of motor 100. A bearing assembly 112 is mounted on the exterior of housing 22 at the end of the housing opposed to the end portion at which flange housing 102 is located.

When actuator/motor 100 is operating the bearing in housing 105 forming part of the harmonic drive 104 is rotated thereby rotating flange housing 102 and flange 82 attached thereto about cylindrical axis 28. Actuator 100 is provided with sensors 116 for sensing the position and velocity of the actuator or motor shaft. A preferred sensor 116 comprises an optical encoder with 500 pulse/rev and a quadrature output of 2000 pulses/rev.

Figure 6:
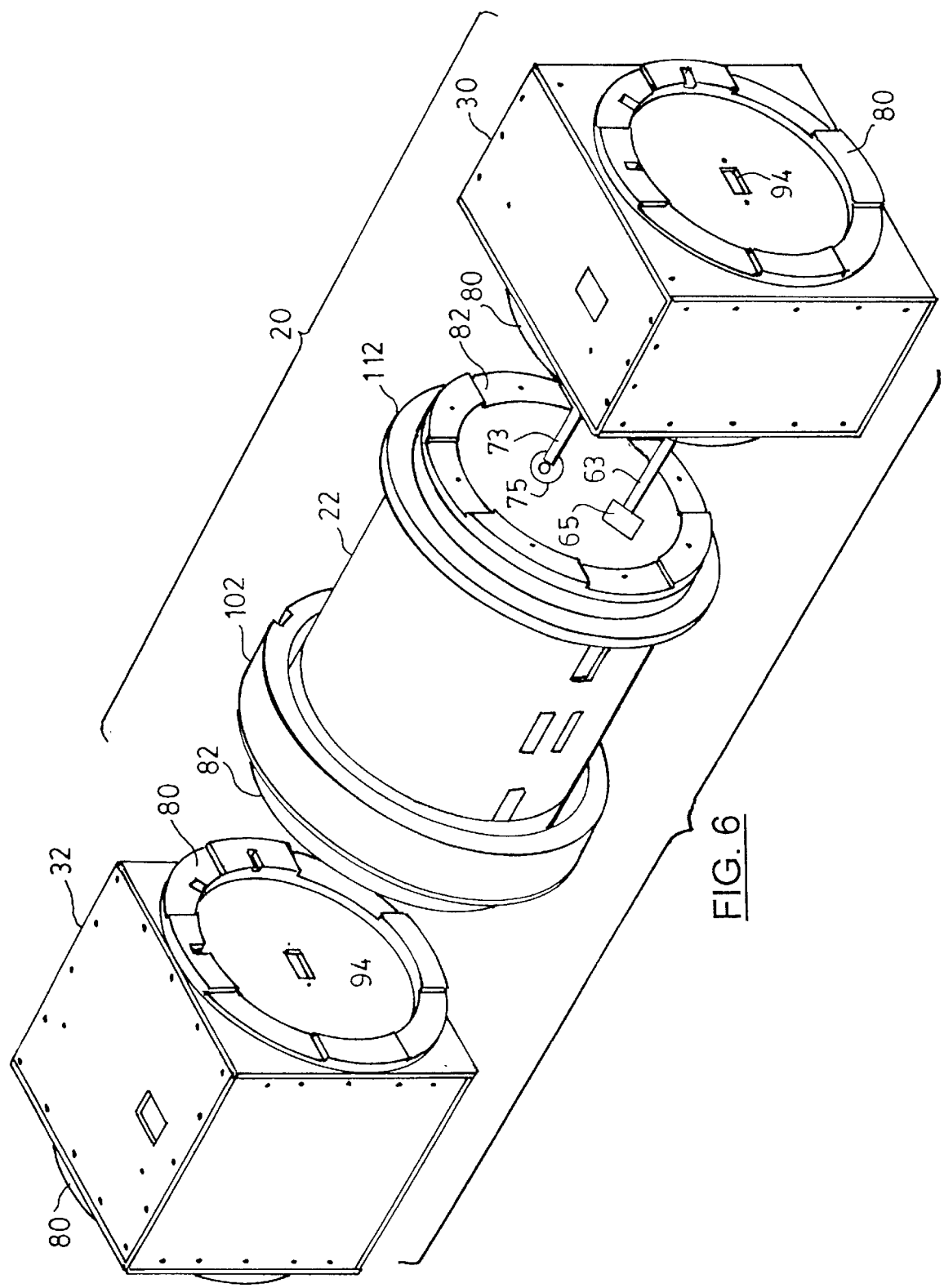
FIG. 6 is a perspective view of a modular joint prior to assembly in the roll configuration of FIG. 1.

The electrical compartment housings 30 and 32 are adapted to be rapidly attached/detached to/from central housing 22 in the roll configuration of FIG. 1 using coupling mechanisms 24 and 26 respectively. Referring to FIG. 6, the electrical compartment housing 30 forming part of joint 20 and electrical compartment housing 32 forming part of a subsequent modular joint (not shown) are each provided with circular flanges 80 on opposed faces of the rectangular housings which form part of the coupling mechanisms 24 and 26. Each flange 80 has a stepped circular pattern adapted to mate with corresponding stepped patterns on circular flanges 82 located at the ends of housing 22. In the roll configuration, housings 30 and 32 are releasibly attached to the flanges 82 at the ends of central housing 22 by means of two C-shaped compression clamps 89 (FIG. 5) which also form part of coupling mechanisms 24 and 26. The C-shaped clamps engage the peripheral edges of flanges 80 and 82 within slot 91 (FIG. 5) and a stainless steel strap is located in the outer slots 93 (FIG. 5) and a tension mechanism (not shown) is used to tighten the strap. This locks together the flanges 82 on the ends of housing 22 to flanges 80 on electrical boxes 30 and 32. The grooved circular flanges 80 and 82 prevent relative rotation of the electrical compartment box and central housing 22 attached to each other.

Figure 11:
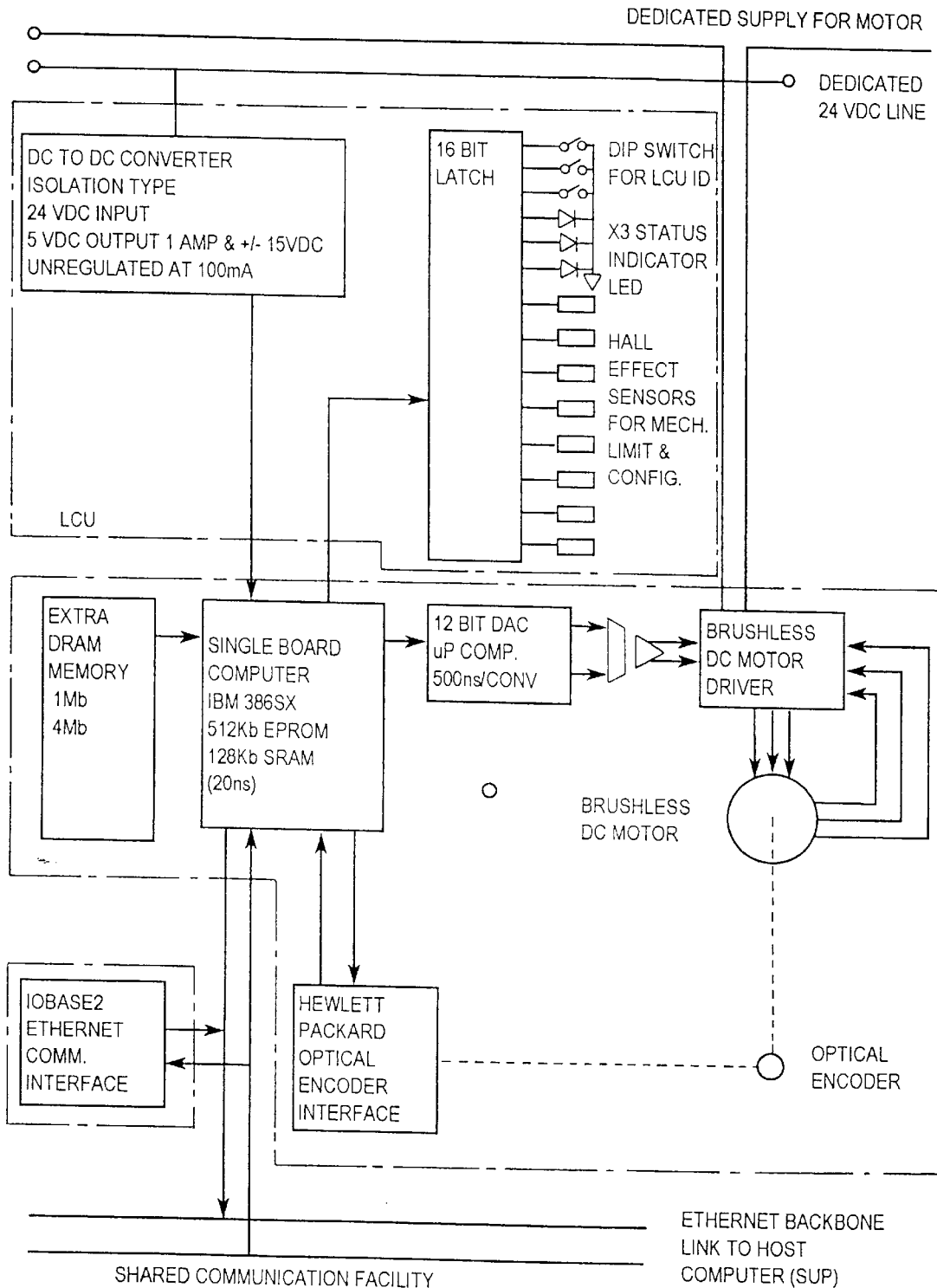
FIG. 11 is a block diagram of a control system for controlling a robot constructed using the modular joints in accordance with the present invention.

The electrical compartment boxes 30 and 32 contain electronic circuits including but not limited to a servo amplifier for motor 100 (see FIG. 5) contained within housing 22, sensor interface electronics, a microprocessor, and communication circuitry. A schematic circuit diagram showing the on-board control subsystem for each modular joint is shown in FIG. 11. It will be appreciated by those skilled in the art that the components shown in FIG. 11 are meant only to be illustrative and not limiting in any way. For example the 386SX processor could easily be superseded by more powerful microprocessors such as those based on the pentium family of chips.

Figure 7:
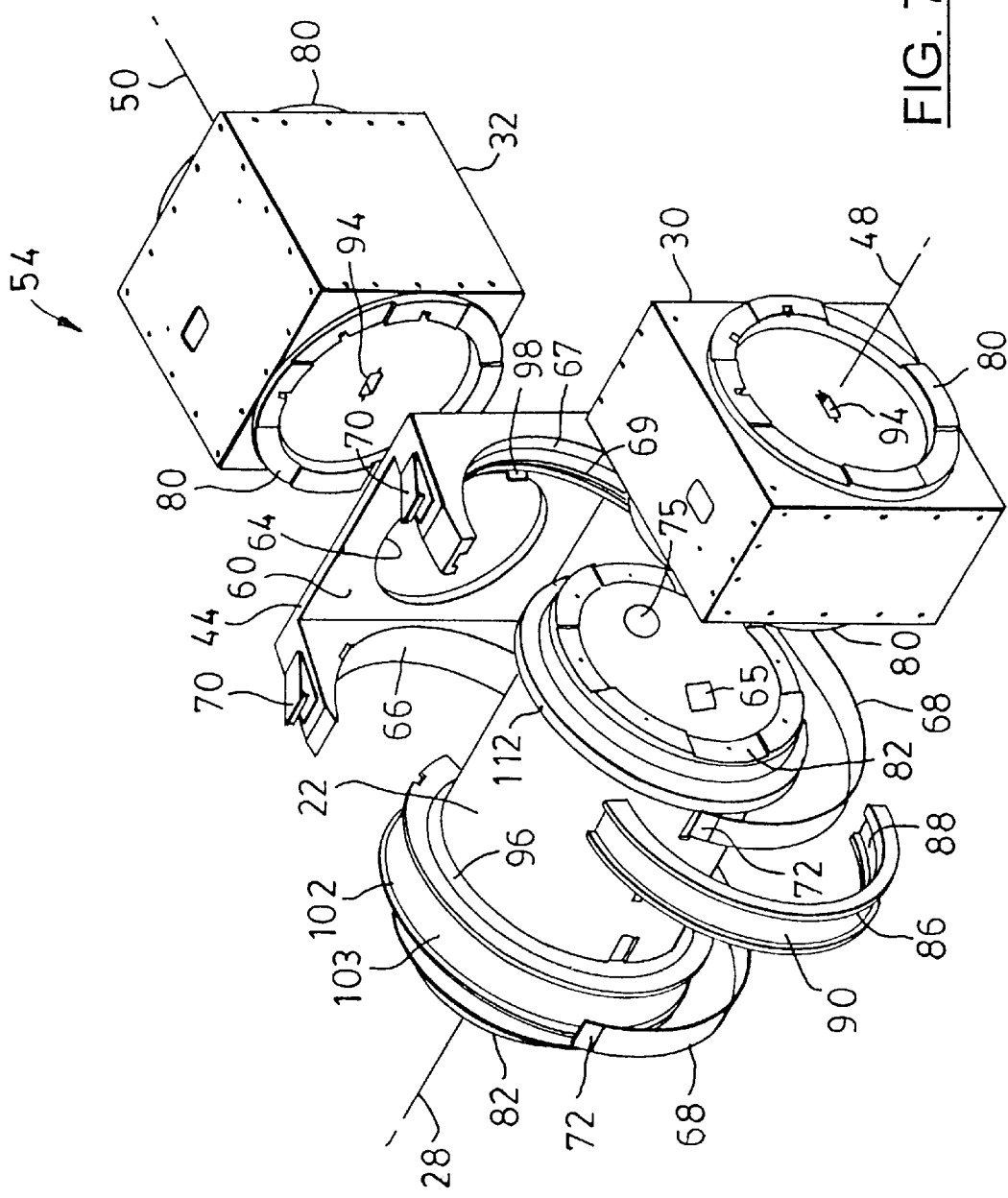
FIG. 7 is a perspective view of a modular joint prior to assembly in the pitch configuration of FIG. 2.

Referring to FIGS. 6 or 7, an electrical connector plug 94 is provided on opposed sides of each of the compartment boxes 30 and 32 which provide external connection of the power and communication bus through the joints. A wire harness 63 is plugged into a plug 65 to connect the motor control electronics in compartment 30 to the actuator in housing 22 and a wire harness 73 connects the microprocessor to a sensor interface 75 in housing 22.

FIG. 7 shows a view of modular joint 54 (FIG. 2) prior to assembly with compartment 32 in the pitch configuration.

The pitch configuration of the joint is obtained by securing link 30 to one end of housing 22 using releasible coupling mechanism 24 discussed previously. Link 30 is rigidly connected to the end of housing 22 and does not move relative to the housing. Link 32 is connected to housing 22 by releasible coupling mechanism 44. Coupling mechanism 44 includes a yoke 60 with a plate 64 with a central hole and a pair of semi-circular yoke arms 66 and 67 attached along opposed edges of plate 60. A flexible steel strap 68 is attached to one end of the two yoke arms 66 and 67 and a latch 70 is mounted on the other ends of each yoke arm to engage the loops 72 located at the ends of the steel straps. Yoke arm 67 includes an inner groove 69 into which the peripheral edge of bearing 112 is seated. A Teflon sleeve 86 is provided with a concave groove 88 which receives the peripheral edge of bearing 112 and strap 68 sits in groove 90 on the outer surface of sleeve 86 with the loops 72 engaged in latches 70.

Housing 22 includes a wire housing or winding guide 96 which provides a housing for wire bundles carrying power and communications. The smooth concave surface of yoke arm 66 sits in curved slot 103 in the outer surface of flange housing 102 and is locked in place by the associated strap 68 with its loop 72 engaged in latch 70. Yoke arm 67 is mounted on bearing 112 and yoke 66 is mounted on flange housing 102 so that when the actuator within housing 22 is engaged the bearing in the harmonic drive rotates flange housing 102 thereby rotating link 32 in a arcuate path about housing 22 in a plane perpendicular to axis 28 of housing 22.

Figure 8:
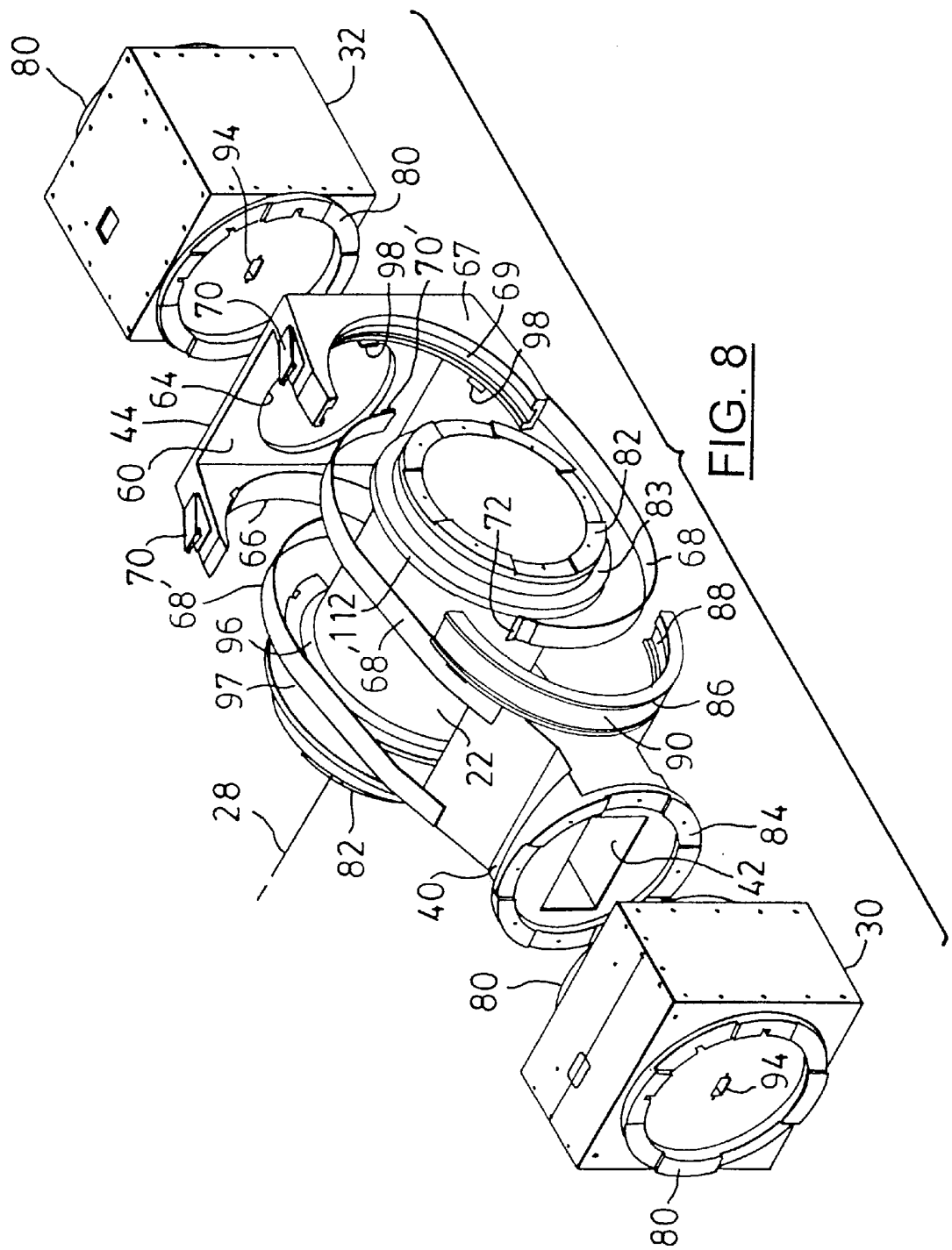
FIG. 8 is a perspective view of a modular joint prior to assembly in the yaw configuration of FIG. 3.

FIG. 8 shows a view of modular joint 36 (FIG. 3) prior to assembly with compartment 32 in the yaw configuration. Compartment 32 is connected to housing 22 using coupling mechanism 44 described above and another coupling mechanism 40 is used to releasibly connect compartment 30 to housing 22. Coupling mechanism 40 is provided with a passageway 42 through which wire harnesses (not shown) electrically connecting the circuits in link 30 to the different components in housing 22 pass. Coupling mechanism 40 is mounted on housing 22 using associated steel straps 68' with loops 70' which are locked into latches (not shown) mounted on the coupling mechanism which are identical to latches 70 on mechanism 44. Coupling mechanism 40 is rigidly attached to housing 22 and does not move relative to the housing in contrast to coupling mechanism 44 which rotates about the housing thereby driving compartment or link 32 in an arcuate path about housing 22 in a plane perpendicular to axis 28.

In the yaw configuration coupling mechanism 44 and therefore link 32 is constrained to rotation through about 270° about the rotational axis 28 of housing 22 to avoid hitting coupling mechanism 40. In the pitch and roll configurations link 32 can be rotated through 360° since there is nothing to obstruct its movement.

Coupling mechanism 44 is used in joints configured in both the pitch (FIG. 2), and yaw (FIG. 3) configurations and is releasibly clamped at the two ends of housing 22 for maximum cantilever effect. The axes 48 and 50 of compartments 30 and 32 respectively are normal to the circular flanges 80 mounted on the compartments and axis 28 of housing 22 is normal to circular flanges 82 (FIG. 5).

Referring again to FIGS. 7 and 8, housing 22 is also provided with Hall effect sensor magnets 98 mounted on coupling mechanism 44 and similar magnets are mounted on harness 40 in FIG. 8. The Hall effect sensors act as limit switches. The two sensors are used to provide direction of travel upon power up.

An actuator/gear system is usually chosen such that the torque required to overcome the load friction and accelerate the load is delivered over the desired speed ranges. The user specifies the torque-speed characteristic as a task requirement. In a modular design, the torque-speed characteristics will vary with configuration. Therefore, in order to match the desired torque-speed characteristics for a given configuration, a choice from a set of different (desired) torque/speed characteristics is offered to the user for every modular joint. This capability is provided in the present invention by allowing for the use of different gears (ratios) with the same actuator, in a given modular joint design.

A housed harmonic drive is preferred to avoid expensive machining costs and misalignments that occur when using units that are not housed and because they are available in standard sizes with different gear reductions. Torque capacities and speed may be changed without affecting the design simply by specifying a different gear reduction. The harmonic drive preferably will have a reduction ratio of 1:120 for a medium sized modular joint (with power capacity of 230 W) and a reduction ratio of about 1:160 for a large sized modular joint (with a power capacity of 560 W).

It will be understood that while the brushless servo motor 100 and harmonic drive 104 are preferred components making up the drive means located in central housing 22 (FIG. 5), other mechanical equivalents of the actuator and transmission may be used.

It will also be understood that numerous other quick connect coupling mechanisms for releasibly connecting at least two link members to central housing 22 in any one of the three configurations (roll, pitch and yaw) could be used in addition to the quick release mechanisms disclosed herein.

As discussed above, the electronic compartments serve two purposes, the first being as structural linkages for connecting different modular joints to the base and end-effector and the second being as housings for electronic circuits and the microprocessor for controlling the joints. However it will be understood that the essential function of the housings is to provide rigid links connecting a reconfigurable joint to other joints and a support base and end-effector which can be quickly connected to the joints. It will also be understood that the microprocessor and control electronics may also be housed in housing 22 instead of in compartments 30 and 32 in which case the basic modular joint would comprise the housing 22, the drive mechanism and the coupling mechanisms.

While the modular joint has been disclosed with respect to rotary joints, it will be understood the present invention can also be implemented using translation joints. The rotary joints could be easily converted to translational joints by slight modifications so that, referring to FIG. 1, the axis 28 of housing 22 would become an axis of translation. In this case housing 22 contains a telescopic mechanism that extends along the axis 28. Therefore, the distance between the compartments 30 and 32 will change as the joint extends. This configuration of the module is called an "extension joint" and is analogous to the "roll" configuration of the rotary joint.

A translation joint analogous to the pitch configuration is a "sliding" joint is obtained by modifying the structure of FIG. 2. In this case the compartment 30 is fixed to the housing 22, while the compartment 32 (together with coupling mechanism 44) is mounted for sliding along the axis 28. The housing 22 is as long as needed to allow compartment 32 to slide the desired distance parallel to axis 28.

Referring to FIG. 4, the mechanism will be different in terms of the gear only. The motor 100 is attached to a lead-screw mechanism so that the rotation of the motor is converted to the translation of the lead mechanism along the axis 28.

ii) Robotic Devices Based on Reconfigurable Modular Joints

Each reconfigurable module provides automated motion control along or about a single axis (degree of freedom). Multiple modules can be cascaded to achieve motion control about multiple axes. Multiple modules may be physically linked to form an integrated robotic system, in which case each module functions as an intelligent robotic joint. Alternatively, multiple reconfigurable modules may be dispersed in an automation cell as modular drive units that are interconnected with each other.

Figure 9:
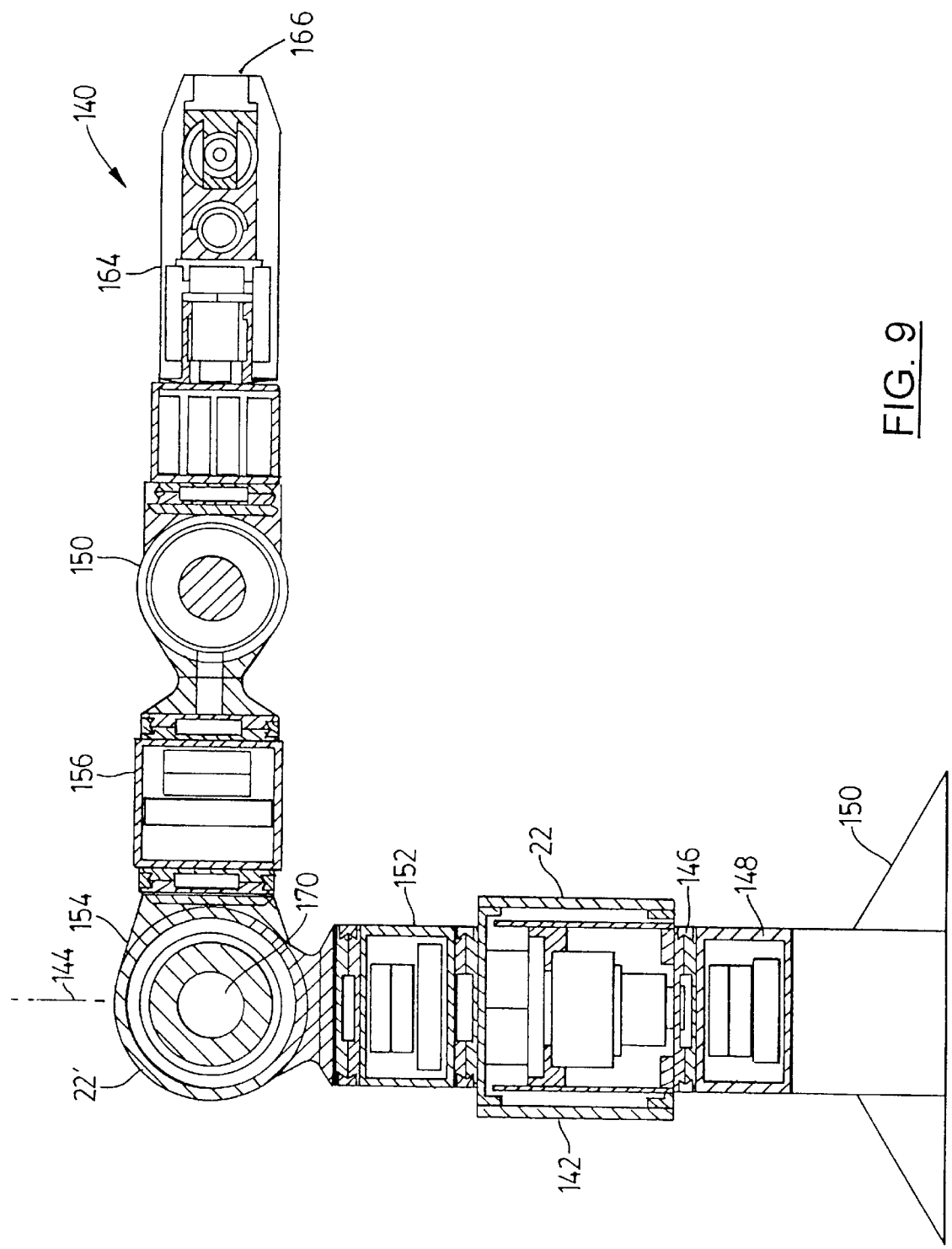
FIG. 9 is a cross sectional view of a first robot assembled from three modular joints and a wrist assembly.

FIG. 9 shows a robot 140 constructed using several of the modular joints described above. Robot 140 comprises modular joint 142 configured as a roll joint the same as joint 20 shown in FIG. 1. Joint 142 allows for rotation of the whole robot 140 about a vertical axis 144. Modular joint 142 is provided with an input port 146 to which electronics compartment 148 is attached at one end of the joint housing 22 and compartment 148 is mounted on a support base 150. An electronic compartment 152 is attached to the other end of the housing of joint 142 and the robot is provided with a second modular joint 154 attached to the opposed end of compartment 152. The output port of modular joint 154 is attached to electronics compartment 156 with the other end of compartment 156 being attached to the input port of a third modular joint 160. An electronic compartment 162 is attached to the output port of joint 160 and a wrist module 164 having three axes of rotation is attached to the opposed end portion of compartment 162. An end flange 166 is attached to wrist module 164 and the three axes of rotation of wrist module 164 permits the end flange 166 to change its orientation with respect to the wrist base. The wrist module 164 may be a standard robotic module or custom designed for a specific application.

Modular joint 154 is configured as a "yaw" joint to allow for rotation of the robotic arm comprising compartment 156, joint 160, compartment 162, the wrist module 164 and end flange 166 about a horizontal axis 170. Modular joint 154 is termed a "shoulder joint", while the third joint 160 serves as an "elbow" joint. All attachments are realized by the use of quick-connect mechanisms. The "elbow" joint 160 is also configured as a "yaw" joint and is smaller in size than the "shoulder joint" 154, but it has nearly identical structure to that of the joint 154.

Figure 10:
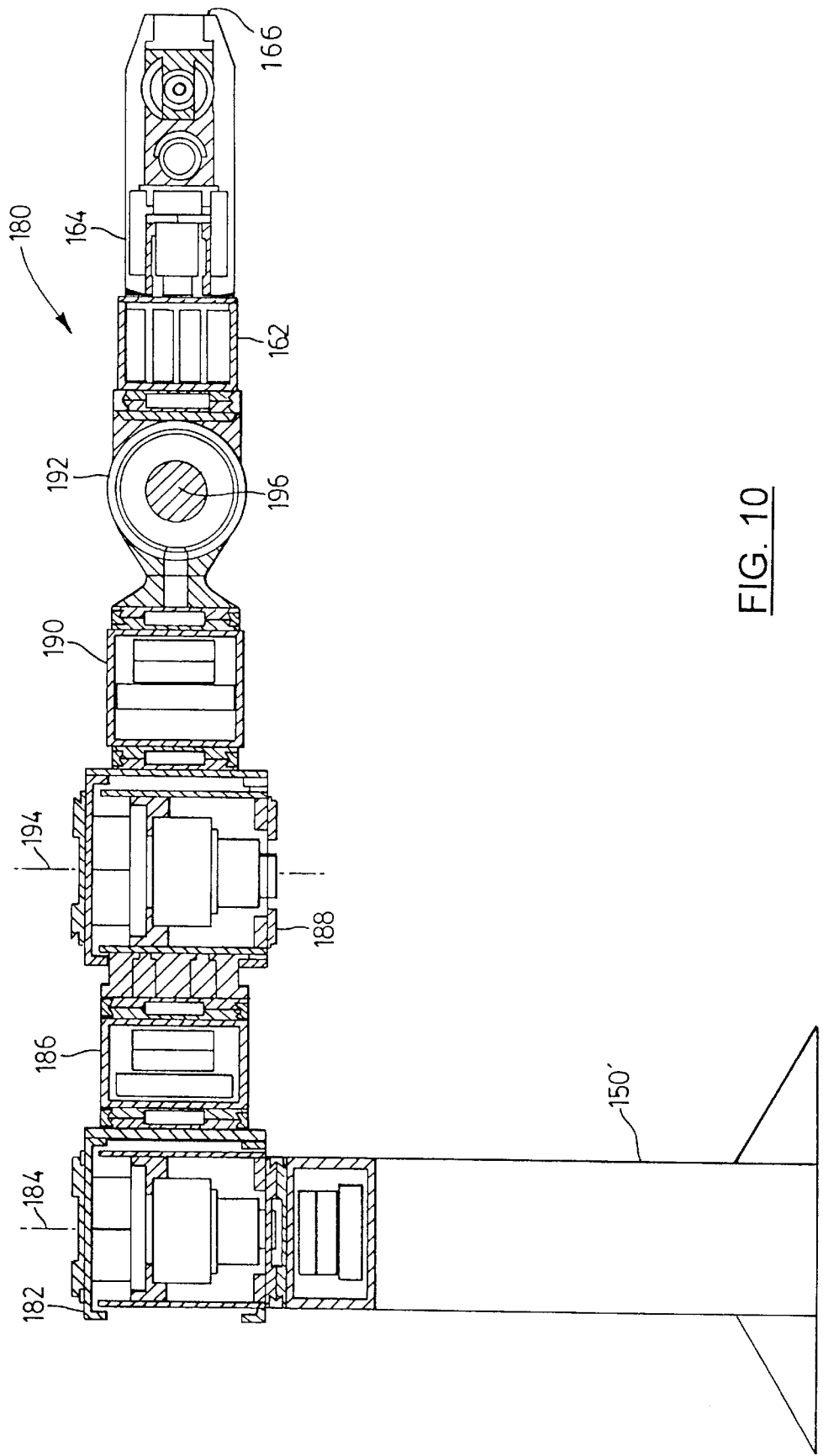
FIG. 10 is a cross sectional view of a second robot assembled from three modular drives and a wrist assembly.

Referring now to FIG. 10, another robot constructed in accordance with the present invention using the reconfigurable modular joints is shown generally at 180. The first modular joint 182 has a vertical axis of rotation 184 and the robotic arm rotates about this axis. Joint 182 is configured as a pitch joint shown in FIG. 2. The input port of a second modular joint 188 is coupled to electrical compartment 186 which is connected to the output port of joint 182. Modular joint 188 is configured as a yaw joint similar to that shown in FIG. 3. The axis of rotation 194 of joint 188 is also vertical. The third joint 192 is also a yaw type joint, but its axis of rotation 196 is horizontal allowing the endpoint 166 to move in a vertical plane. The wrist module 164, similar to that in the robot of FIG. 9, is attached to compartment 162 which is attached to the output port of joint 192 and end flange 166 is attached to wrist module 164.

Robot 180 in FIG. 10 has a different kinematic structure from robot 140 shown in FIG. 9. A significant advantage of the present invention is that robots with different kinematic structures may be easily and rapidly assembled from the same sets of modules so that the task to be performed by the robot is executed in the most optimal way for a given application. The control system, described hereinafter, is designed to recognize the assembled configuration and adjust the control parameters accordingly.

B) CONTROL SYSTEM

Figure 12:
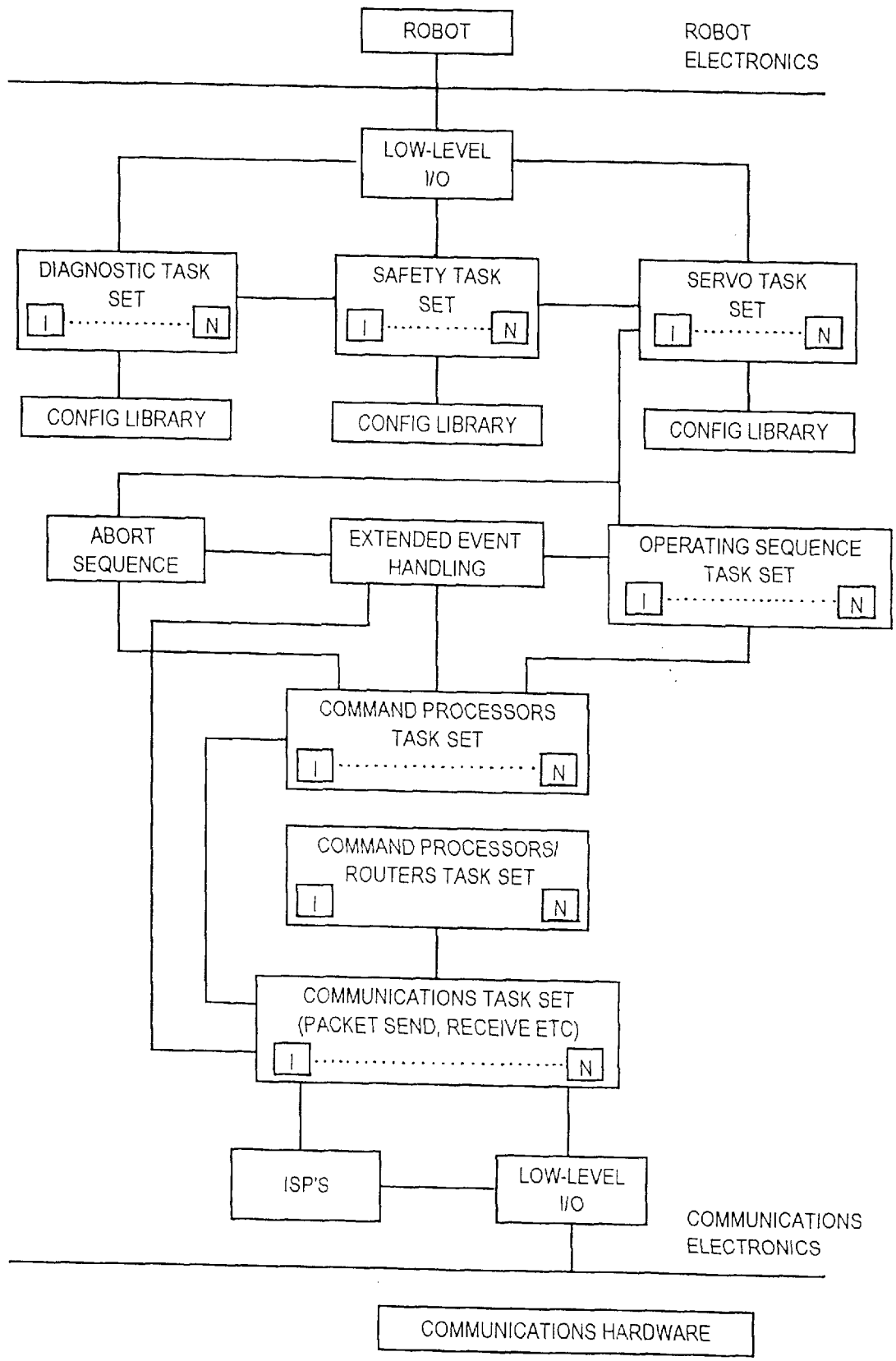
FIG. 12 is a flow chart of a control system hierarchy for controlling a robot or other automated system constructed using the modular robotic joint.

A system constructed using the present reconfigurable modules is a true modular system. A distributed control system is provided for operating simultaneously one or more modular reconfigurable joints which is based on a hybrid, distributed environment, using multiple processors running under different operating systems and controlled by a host computer. Such a system meets both the real-time and user-interface requirements with less development effort. The modules share a common communication bus between themselves, and a host computer which allows a user to enter motion and task commands. The host computer is connected to each microprocessor for bi-directional transfer of data between the host computer and each modular joint-based microprocessor. The modules are "intelligent" in terms of their own processing capability. Every module has its own control and communication software that allows receiving, decoding, and broadcasting messages to other modules in the system. The modules can communicate with each other and carry out actions based on the messages from other modules. FIG. 12 is a flow chart of an example software hierarchy for controlling a robot constructed using the modular robotic joint.

The distributed control system comprises the following four elements:

(1) shared communication facility (SCF), which is a common communication hardware that allows for the transfer of data and control information to and from a local control subsystem (LCS) that is resident on every individual module.

(2) local control subsystem (LCS) located at each reconfigurable module comprising a microprocessor and the associated electronics for performing dedicated servo-control of position of each module in real time.

(3) low level human interface (LLHI) at each module, that allows for direct interaction of a human operator with the LCS. FIG. 11 illustrates these three elements.

(4) supervisory controller (SUP) or the host computer that acts as the master controller, provides a high level user interface, generates control set-points in real time for the LCS, stores data regarding the robot, task and the environment, sends the information pertaining to each controller resident in the LCS, and constantly receives information from the LCS on the performance of the servo-controller.

The communication system via the distributed control architecture performs the following functions: (1) transmission of sensor output, alarm status information, etc., from the LCSs to the host computer; (2) communication of set-points, operating modes and control variables from the host computer to the individual LCSs; (3) down loading of user programs, control system parameters, and the like; and (4) synchronization of message transfer amongst all LCS's in real time. A brief description of the various elements of the distributed control architecture is provided herebelow.

Shared Communications Facility (SCF)

One of the requirements of the distributed control architecture is the capability to update the host computer with the current status of the control variables and parameters of every LCS at 100 Hz. For each variable/parameter that has to be updated, four bytes are required. The variables and parameters include the different timer durations, the desired and actual actuator positions, velocities, the control gains, the output torques, etc. More specifically, at least a total of fifteen variables and parameters have to be updated every 10 ms. That is, every 10 ms, at least 60 bytes (or approximately 500 bits) of information have to be passed to the host computer by every LCS in the network.

To connect all the components of the reconfigurable modular drive system to the distributed control architecture, IEEE 802.3 Ethernet networking software is suitable. The Ethernet is a very wide spread networking protocol (IEEE 802.3) that is standard on most PC's. Maximum throughput is 10 Mb/s (realistic rate is approx. 3 Mb/s) and it supports broadcasting, multicasting, multidrop, and inter-communication between nodes.

Local Control System (LCS)

The local control system is the smallest collection of hardware in the distributed control system that performs closed loop control. The LCS comprises the following elements (see schematic in FIG. 11): (i) a CPU (microprocessor) capable of closed loop servo control of the actuator; (ii) a customized I/O comprising the sensor interfaces to the encoders, Hall effect sensors and LED displays for the Low Level Human interface; (iii) drive amplifier/motion controller for the actuator; and (iv) a communication interface to the shared communications facility.

A digital to analog converter (DAC) interface is used to interface the microprocessor with the analog servo amplifiers. A 10 to 12 bit DAC with fast response is preferred. The analog/digital I/O board (PC/104 data bus compatible) that has two 8 bit DAC channels, and 24 bits of digital I/O is preferred. This provides the analog input to the servo amplifier and most of the interface for the Hall Effect sensors and ID code block but it still requires the LLHI for switches and indicators.

The local control system performs several functions including (i) sampling the encoder and the other sensors at regular intervals; (ii) providing triggering inputs for the drive electronics subsystem to generate pulse width modulated signals for the actuator; (iii) performing basic control of the actuator position and (iv) receiving and transmitting data via the shared communications facility at regular intervals.

The LCS receives a series of control set-points from the host computer at a frequency of about 100 Hz. Using a second order filter as an interpolator between the points, the CPU performs PID control of position at a closed loop bandwidth of 1 kHz. The output of the PID controller is a value to the Digital to Analog Convertor, that corresponds to the "current" duty cycle of the PWM switching amplifier. This signal is fed to drive amplifier/motion controller which takes care of the corresponding electronic commutation that is necessary to drive the brushless DC motor. The position of the shaft is sensed by the encoder as a quadrature pulse. This signal from the encoder is connected to a quadrature decoder/counter, and is read by the CPU as actual position data.

Low Level Human Interface (LLHI)

The low level human interface provides direct control and monitoring of the LCS, thus providing confidence in the status/operation of the module and in the diagnosis of any malfunction.

The LLHI and peripheral interface electronics are contained on a custom I/O card which also contains the peripheral electronics for interfacing the SBC to the various Hall Effect sensors, 4 bit ID code block, optical encoder decoder interface, and contain the low level power supply (+5V regulated and +/−15V). All of the above interfaces would be custom constructed on an experimenter's card and use the PC/104 bus configuration.

The SUP Sub-system

A windows operating environment such as Microsoft Windows NT provides a suitable user interface. The SUP software provides the user interface, allowing the operator to transfer data, monitor system performance, and change parameters on-line. The SUP contains a graphical user interface to help a user to easily perform the following example tasks: definition and planning of a task; monitoring of the status of the overall system using an engineering interface (i.e, a dynamic display of forces (torques), positions, etc.); supervisory control of the task and rapid shut down of the system if necessary; generation of a on-line graphical display of the control variables; on-line refinement of control parameters; display of error messages from every module; choose the mode of transmission (broadcasting or transmission to a specific module, etc.); accessing information in the LCS RAMs; performing standard initialization and shut down routines; and multiple move commands for easy motion control specifications.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A reconfigurable modular joint comprising:
   a) a first housing having a drive means, an axis of rotation and opposed ends;
   b) a first coupling mechanism for releasibly coupling a link member to one of said opposed ends of said first housing;
   c) second coupling mechanism for releasibly coupling a link member to the other of said opposed ends of said first housing; and
   d) a releasibly attachable third coupling mechanism for releasibly coupling a link member to said first housing in a plane perpendicular to said axis of rotation.

2. The modular joint according to claim 1 further including a releasibly attachable fourth coupling mechanism for releasibly coupling a link to said first housing in a plane perpendicular to said axis of rotation and wherein one of the third coupling mechanism and the second coupling mechanism is moveable by said drive means in an arcuate path about said first housing in a plane perpendicular to said axis of rotation.

3. The modular joint according to claim 2 further including a second housing releasibly attached to one of the first, second, third and fourth coupling mechanisms, the second housing having a control circuit connected to at least a microprocessor and releasibly connected to said drive means.

4. The modular joint according to claim 3 wherein said drive means includes at least an actuator and a transmission connected to said actuator.

5. The modular joint according to claim 4 including a sensing means for sensing position and velocity of said actuator, and wherein said sensing means is connected to said microprocessor.

6. The modular joint according to claims 5 wherein said transmission is a harmonic drive.

7. The modular joint according to claim 6 wherein said actuator is a brushless DC servo motor.

8. The modular joint according to claim 2 wherein each of said first, second, third and fourth coupling mechanisms includes a first flange and each link member has a second flange attached to at least one end of each link member and wherein said first flange is adapted to mate with said second flange.

9. The modular joint according to claim 8 further including quick release clamps for clamping said link members to said first flanges.

10. The modular joint according to claim 9 wherein each link member has a second flange at each end thereof.

11. The modular joint according to claim 10 further including a quick release clamp for clamping said third coupling mechanism to said first housing.

12. The modular joint according to claim 11 further including a flange housing having opposed ends and a second flange mounted at one end thereof and a second flange mounted at the other end thereof and wherein said flange housing is releasibly attached to one of the first coupling mechanism and the second coupling mechanism and having an axis of rotation collinear with the axis of rotation of the first housing, and wherein the flange housing is connected to said drive means for rotation about the axis of rotation of the first housing.

13. The modular joint according to claim 12 further including a yoke means and a quick release clamp for clamping said fourth coupling mechanism to said first housing, said yoke means including a first flange adapted to mate with said second flange on a link member, said first flange having an axis of rotation substantially perpendicular to the axis of rotation of said first housing, and said yoke means being movable by said drive means in said arcuate path about said first housing.

14. The modular joint according to claim 13 further including a second housing releasibly attached to one of the first, second, third and fourth coupling mechanisms, the second housing having a control circuit connected to at least a microprocessor and releasibly connected to the drive means.

15. The modular joint according to claim 14 wherein said drive means includes at least an actuator and a transmission connected to said actuator.

16. The modular joint according to claim 15 including a sensing means for sensing position and velocity of said actuator, and wherein said sensing means is connected to said microprocessor.

17. The modular joint according to claim 16 wherein said transmission includes a bearing connected to a shaft of said actuator, said flange housing being rigidly connected to said bearing.

18. A reconfigurable modular robot, comprising:
   a) plurality of link members;
   b) at least one modular joint including at least
      i) a first housing having a drive means, an axis of rotation and opposed ends;
      ii) a first coupling mechanism for releasibly coupling a link member to one of said opposed ends of said first housing; and
      iii) a second coupling mechanism for releasibly coupling a link member to the other of said opposed ends of said first housing; and iv) a releasably attachable third coupling mechanism for releasably coupling a link member to said first housing in a plane perpendicular to said axis of rotation, c) an end-effector connected to one of said second link members driven by one of said modular joints; and d) computer control means for controlling said at least one modular joint.

19. The robot according to claim 18 wherein said drive means is a rotary drive means, and wherein said second coupling mechanism is adapted to releasibly couple said second link member to said first housing in one of two configurations including a first configuration in which said second link member is rotatable by said drive means about said axis and a second configuration in which said second link member is moveable by said drive means in an arcuate path about said first housing in a plane perpendicular to said axis.

20. The robot according to claim 18 wherein said drive means is a translational drive means, and wherein said first coupling mechanism is adapted to releasibly couple said first link member at one end portion of said first housing and said second coupling mechanism is adapted to releasibly couple said second link member at an opposed end portion of said first housing, said translational drive means being connected to a telescoping mechanism attached to said first and second coupling mechanism for translating said first and second link members along said axis towards and away from said first housing.

21. The robot according to claim 18 wherein said first housing is an elongate housing and said drive means is a translational drive means, said second coupling mechanism being adapted to releasibly connect said second link member to said elongate housing and said translational drive means is adapted to translationally move said second housing along said elongate housing parallel to said axis.

22. The robot according to claim 19 wherein said first and second coupling mechanism are adapted to releasibly connect said first and second link members to said first housing in one of three configurations including a roll configuration comprising said first link member being connected at said opposed one end of the first housing and said second link member being connected to said flange at the other end of said first housing;

a pitch configuration comprising said first link member being connected at said opposed end of the first housing and the second link member being connected to the second coupling mechanism in the second configuration; and a yaw configuration comprising the first link member connected to said first housing in the configuration comprising said first link member aligned along an axis substantially perpendicular to said axis of rotation, and said second link member being connected to the second coupling mechanism in the second configuration.

23. The robot according to claims 22 wherein said drive means includes at least a control circuit, and a microprocessor located in said first housing and connected to said control circuit for controlling movement of said modular joint.

24. The robot according to claims 23 wherein said first link member is a second housing, and wherein said drive means includes at least a control circuit located in said second housing, and said computer control means includes at least a microprocessor located in said second housing and connected to said control circuit for controlling movement of said modular joint.

25. The robot according to claims 24 including a sensing means for sensing position and velocity of said drive means, and wherein said sensing means is connected to said microprocessor.

26. The robot according to claims 25 wherein said second link member includes a third housing and wherein said second link member connected to the second coupling mechanism on said at least one modular joint comprises a first link member connected to a first coupling mechanism on another modular joint or is connected to said end-effector.

27. The robot according to claims 26 wherein said drive means includes at least an actuator and a transmission connected to said actuator, said actuator and transmission being located in said first housing.

28. The robot according to claims 26 wherein said computer control means includes at least a computer connected to each microprocessor in the modular joints.

29. The robot according to claim 28 wherein the transmission is a harmonic drive.

30. The robot according to claims 28 wherein the actuator is a brushless DC servo motor.

* * * * *